UNITED STATES PATENT OFFICE.

RICHARD KIRCHHOFF, OF BERLIN, GERMANY, ASSIGNOR TO THE ACTIEN-GESELLSCHAFT FÜR ANILIN FABRIKATION, OF SAME PLACE.

BLUE AZO DYE.

SPECIFICATION forming part of Letters Patent No. 536,532, dated March 26, 1895.

Application filed October 29, 1894. Serial No. 527,330. (No specimens.)

*To all whom it may concern:*

Be it known that I, RICHARD KIRCHHOFF, of Berlin, in the Kingdom of Prussia, German Empire, have invented new and useful Improvements in the Production of a Bluish-Black Dye; and I do hereby declare that the following is a full, clear, and exact description of the invention, which will enable others skilled in the art to which it appertains to make and use the same.

The invention relates to the production of a new tetrazo-coloring-matter, which produces on unmordanted cotton in an alkaline or salt bath deep bluish-black shades of remarkable intensity. Moreover by treating the fiber dyed with this new dye with nitrite in an acid solution and developing subsequently in an alkaline or weakly acidulated solution of phenols or amins, more deep bluish and even black tints are obtained, which are distinguished by their intensity and their fastness.

This new coloring matter is produced by reacting with two molecules of gamma-amidonaphtolmonosulfo acid in alkaline solution upon one molecule of tetrazotized para-amidobenzene-azo-amido-para-cresolether.

The aforementioned diamido base may be obtained by combining para-nitro-diazobenzene with amido-para-cresolether and reducing the nitro-amido-azo-compound by means of alkali sulphids. The base derived in this way for instance from para-amido-cresol-methylether ($CH_3 : OCH_3 : NH_2 = 1:4:3$) forms in dry state a yellowish brown powder, easily soluble in alcohol or benzene with a yellow color, melting at 115° centigrade. It is soluble in diluted hydrochloric acid with deep-red color.

The preparation of the new dye derived from this base may be practically carried out in the following manner: Twenty-six and one-half kilograms of para-amidobenzene-azo-amido-para-cresol-methylether or the corresponding quantity of its sulfate or hydrochlorate and sixty kilograms of hydrochloric acid are dissolved in water and diazotized in the well known manner by means of fourteen kilograms of sodium nitrite. The diazo-body, which forms a yellow-brown solution is added to a solution of fifty kilograms of gamma-amidonaphtolsulfo acid and sixty kilograms of carbonate of soda. The coloring-matter separates in the shape of a black powder. The solution is gently heated for some time. Then the dye-stuff is filtered off, pressed and dried.

The new dye forms in dry state a brownish-black powder, slightly soluble in cold water and more readily in hot water with an indigo-blue color. This color is not changed on addition of caustic soda lye, an excess of the latter producing a dark blue precipitate of the coloring matter. From the aqueous solution of the dye the free color-acid is immediately precipitated by the addition of mineral acids in the shape of dark-blue flakes, more slowly when acetic acid is added.

The dye is practically insoluble in alcohol, or in ether. The solution in concentrated sulfuric acid possesses a blackish-blue color, which on diluting with water changes at first into blue and then into violet, while the free color-acid separates in dark-blue flakes.

Having now described my invention, what I claim is—

The hereinbefore described dye derived from one molecule of tetrazotized para-amidobenzene-azo-amido-para-cresolether and two molecules of gamma-amidonaphtolmonosulfo acid possessing the constitution formula:

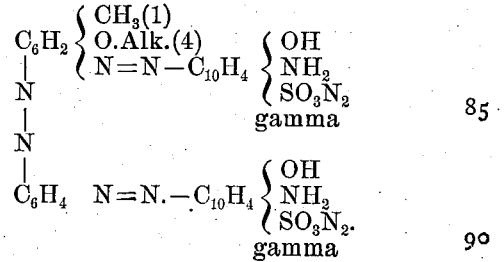

which dye is slightly soluble in cold water, more readily in hot water with an indigo-blue color, practically insoluble in alcohol and ether, soluble in concentrated sulfuric acid with blackish-blue color, which on diluting with water changes at first into blue and then into violet, while the free color-acid separates in dark-blue flakes, producing on unmordanted cotton bluish-black shades.

In testimony whereof I hereunto set my hand and affix my seal, in the presence of two witnesses, this 10th day of October, A. D. 1894.

RICHARD KIRCHHOFF. [L. S.]

Witnesses:
 RUDOLF VON ROTZENBURG,
 GUSTAV LUCHT.